United States Patent [19]

Jegousse

[11] 4,068,490
[45] Jan. 17, 1978

[54] METHOD AND APPARATUS FOR ASSEMBLING AND LAYING UNDERWATER PIPELINE

[75] Inventor: Michel J. Jegousse, Nantes, France

[73] Assignees: Compagnie Francaise des Petroles, Paris Cedex; Études Petrolieres Marines, Societe, Paris; Ateliers et Chantiers de Bretagne, Nantes; Compagnie Maritime d'Expertises, Marseille; Compagnie Generale pour les Developpements Operationnels des Richesses Sous-Marines (DORIS), Paris; Entreprise de Recherches et d'Activites Petrolieres (E.R.A.P.), Paris, all of France

[21] Appl. No.: 683,345

[22] Filed: May 5, 1976

[30] Foreign Application Priority Data

May 6, 1975 France .................................. 75 14079

[51] Int. Cl.² ............................................. F16L 1/00
[52] U.S. Cl. ......................................... 61/108; 61/110
[58] Field of Search .................. 61/107, 108, 109, 110, 61/111

[56] References Cited

U.S. PATENT DOCUMENTS 3,680,322  8/1972  Nolan, Jr. et al. .................... 61/108

FOREIGN PATENT DOCUMENTS 1,492,277  7/1967  France .................................. 61/108
1,178,219  1/1970  United Kingdom ................... 61/108

*Primary Examiner*—Jacob Shapiro
*Attorney, Agent, or Firm*—Sughrue, Rothwell, Mion, Zinn and Macpeak

[57] ABSTRACT

In the assembling and laying of an undersea pipe in which the already submerged pipe portion is suspended from a surface support, the end of the submerged pipe portion being supported on a variable inclination laying ramp, and a new pipe section is moved into alignment with the end of the pipe portion and fixed thereto, the submerged pipe portion is so suspended from the surface support that the tension in the pipe portion is maintained substantially constant irrespective of vertical movements of the surface support caused by the action of waves on the surface support.

31 Claims, 3 Drawing Figures

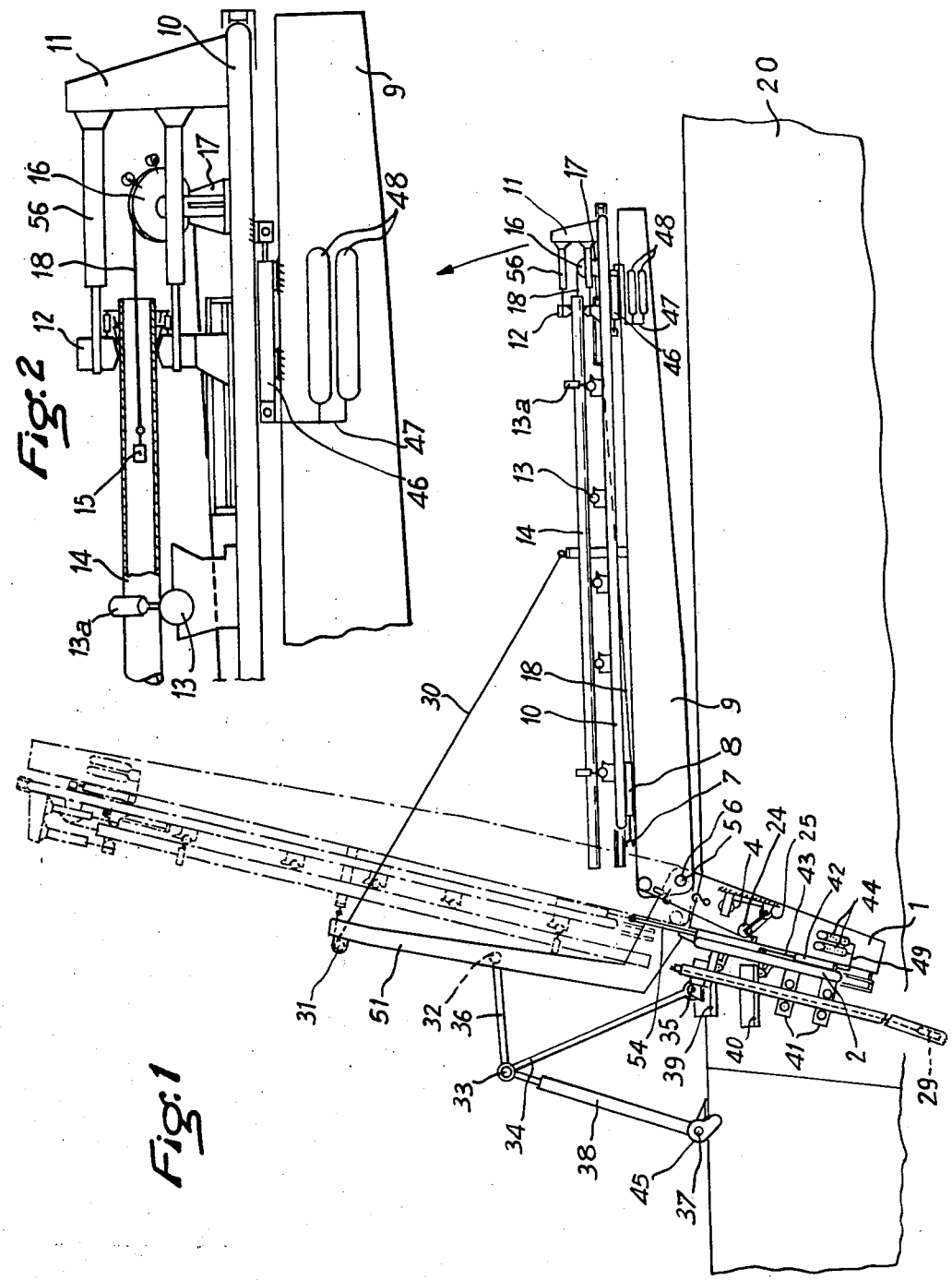

METHOD AND APPARATUS FOR ASSEMBLING AND LAYING UNDERWATER PIPELINE

The invention refers to a method of and apparatus for assembly and laying of an undersea pipe constituted by a plurality of pipe sections which are fixed together.

Although the subsequent description of the invention refers particularly to the method of pipe laying known under the designation of 'laying in a J', that is to say, in which the slope of the pipe varies so as to impose upon it no point of inflection, it is in fact applicable to any method in which the end of the pipe on board a surface support such as a laying barge undergoes a displacement with respect to the support because of the pitching and pounding caused by the swell and bad weather.

One of the advantages of the method of laying in a J is that of avoiding the use of ramps of large dimensions, with well defined curvatures and of offering considerable security against accidental deformations because of the elimination of points of inflection along the curve formed by the pipe, the end of which is resting on the bottom. However, if experience has been able to show that by keeping the surface end of the pipe at a certain angle one was assured of its laying in position without accidental deformation, experience obtained hitherto has related only to pipes of small section, the diameter of the pipes employed being at most equal to about 25 cm, and in water of no great depth.

It has been observed, however, during the course of development of mathematical programmes of dynamic simulation for pipes of larger diameter and for pipe laying at any depth, that, whatever the slope given to the ramp bearing the end of the pipe, one could not avoid the appearance of waves of transverse deformation as soon as the tension applied to the end of the pipe was no longer greater than a certain critical tension, it being impossible to maintain the required known conditions because of the movements of the barge and especially its pounding.

It is an object of the present invention to provide a method of laying undersea pipe, in accordance with which the submerged portion of the pipe in course of being laid is always subjected to a force greater than the critical force below which waves of transverse deformation appear, by the employment of means for compensating for changes in the forces applied to the pipe portion because of the relative displacement of the surface support and the end of the pipe portion.

Another object of the invention is to provide apparatus for putting into effect the foregoing method, which comprises means for suspending the end of the submerged pipe portion from the surface support, which suspension means is connected to the surface support by a deformable and adjustable damping or compensation means.

By use of the above method and apparatus, whatever the movements of the surface support with respect to the end of the submerged pipe portion the appearance of any wave of deformation can be avoided, a hydropneumatic means, for example, being used to ensure a substantially constant tension in the submerged pipe portion greater than the limiting tension for the depth of lay and the diameter of the pipe.

The apparatus may include means connected to damping means for suspending a pipe section to be connected to the end of the portion already submerged, the two suspension means being connectable together by a device which ensures synchronization of the movements of the end of the submerged pipe portion and of the section to be connected.

By use of the above described apparatus a tension can be maintained which is greater than the critical tension, as well as the synchronization of the movement of the end of the submerged pipe portion and of the new pipe section to be connected thereto. It then becomes possible to employ any known means for connecting the section to the pipe portion whilst maintaining the required tensile force on the pipe portion.

In accordance with the method of laying in a J, the barge is displaced by a distance corresponding to the length of the new section, while progressively submerging the newly attached pipe section to bring the upper end of the section opposite the means of suspension of the submerged pipe portion.

The invention will be more fully understood from the following description of an embodiment thereof, given by way of example only, with reference to the accompanying drawings.

In the drawings:

FIG. 1 is a general diagrammatic view of an embodiment of apparatus according to the invention, partly cut away;

FIG. 2 is an enlarged view of part of the apparatus of FIG. 1; and

Figure 3:
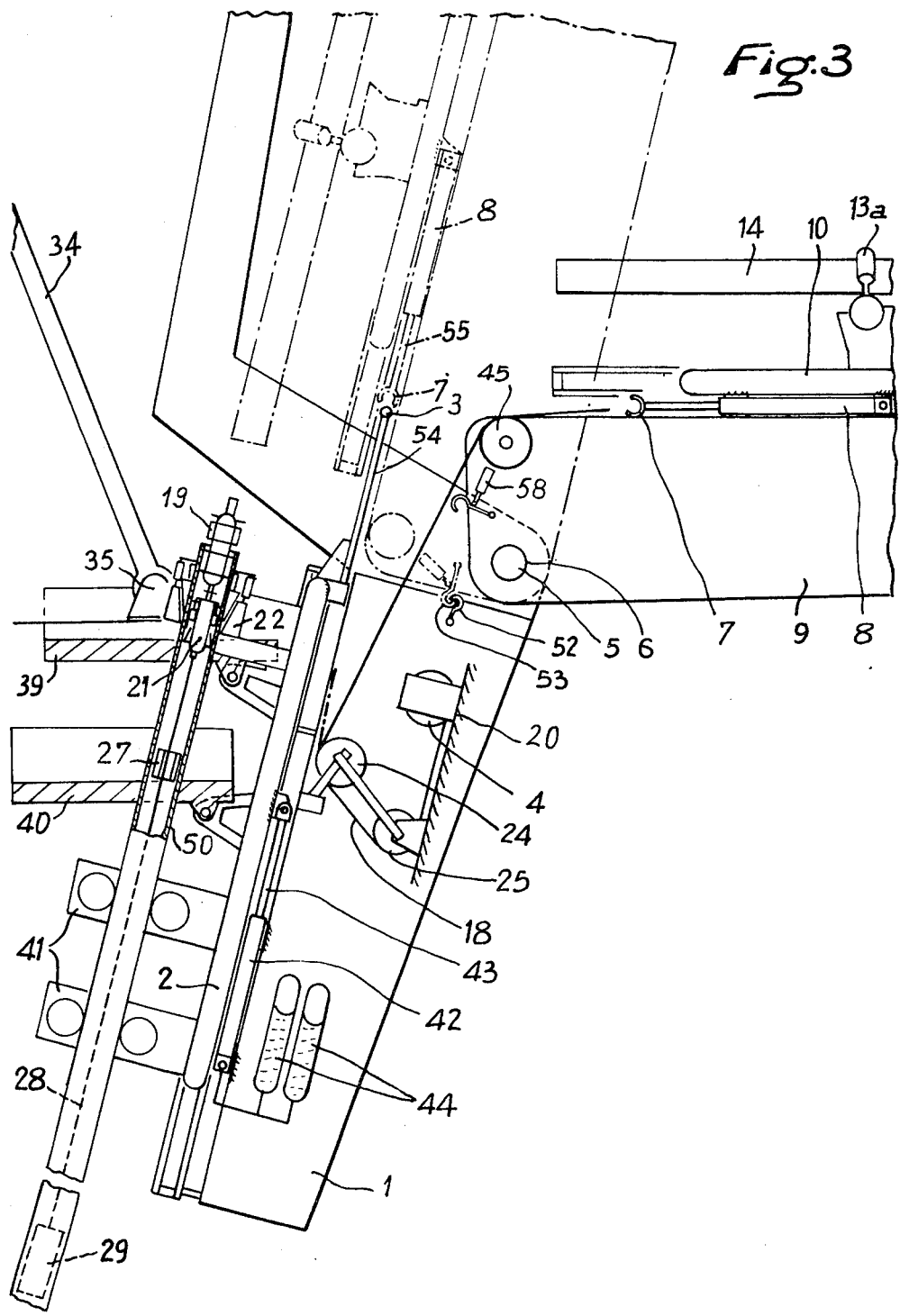
FIG. 3 is an enlarged view of another part of the apparatus of FIG. 1.

In the drawings, the laying barge 20, which may be any suitable surface support carries a laying ramp 1 the slope of which can be varied by rotation of the ramp about the shaft 5. A feed ramp 9, pivotable about a shaft 6 coaxial with shaft 5 enables a new section 14 of pipe to be brought into alignment with the last attached section 50 of the submerged pipe or pipe-line P.

The end of the last section 50 of the pipe P is held by a set of jaws 22 of any suitable type, which are mounted on a member or slide 2 which is displaceable longitudinally along the ramp 1 under the control of damping or compensation means in the form of a jack 42. For this purpose the end of the rod 43 of the jack 42 is connected to the slide 2, the body of the jack being fixed to the ramp 1. The control chamber of the piston of jack 42 is connected by a pipe 49 to two hydropneumatic accumulators 44.

Similarly the new pipe section 14 is held on a feed ramp 9 by jaws 12 mounted on a structure 11 mounted on a member or slide 10. The jaws 12 may be of any suitable type. The connection between the ramp 9 and the slide 10 is provided by damping or compensation means in the form of a jack 46, the control chamber of which is connected to hydropneumatic accumulators 48 by pipe 47. In order to facilitate the alignment of the new section 14 with the last section 50 of the pipe P, the section 14 is supported on the ramp 9 by adjustable rollers 13 and 13a. With the new and last pipe sections aligned, one can proceed to screw up the joint or, with bevels on the sections parallel, one can proceed to weld the joint.

Although slideways are provided for guiding the movable parts, e.g. jaws 12 and 22 and slides 2 and 10, these slideways have not been shown for greater clarity in the drawing.

The slope of the ramp 1 is controlled, in the embodiment illustrated, by a screw-and-nut telescopic system 38 of which one end is articulated at 37 to the surface support, the system being controlled, for example, by a geared motor 45. Displacement of the axis of a pin 33 at the other end of the telescopic system 38 brings about rotation of the ramp 1 about the shaft 5 through a connecting rod 36 hinged to the ramp at 32. The pin 33 is in addition connected to the surface support 20 by a connecting rod 34 pivoted on the surface support at 35.

Raising of the ramp 9 about the shaft 6 may be effected by means, for example, of a cable 30 and a winch 31 or by means of jacks arranged at suitable places. Locking means of any suitable kind, represented diagrammatically by hooks 52 and 53, the latter being controlled by a jack 58, ensure if required the locking together of the ramps 1 and 9, when aligned.

When the ramps 1 and 9 are aligned, the slides 2 and 10 may be locked together by means, for example, of a synchronization jack 8 which is fixed to the slide 10. The rod 55 of the jack 8 carries at its end a catcher device 7 which snaps onto the end 3 of an arm 54 which is fixed to the slide 2. Control of the locking or unlocking of the slides 2 and 10 may be effected by any suitable device and does not necessitate any great force by the jack 8 upon its rod 55. In this way the synchronization of the two slides 2 and 10 is ensured and if necessary the repositioning of the slide 10 with respect to the slide 2 after displacement of the rod 55 has been effected by the required distance and after the rod has been fixed. Thus the jack 8 plays the part of an adjustable-position coupling.

The surface support is provided with any suitable means for preserving a fixed position during the course of connecting the section 14 of the pipe P, and then for displacing the support by a distance equal or corresponding to the length of the new section, when the lower end of the pipe P is already resting on the bottom of the water. The slope of the ramp 1 is adjusted as a function of the depth of lay and the characteristics of the pipe P, particularly its diameter and weight 50 that the pipe has at any moment a position close to the required position, when the section 50 is being guided between the rollers 41 on the ramp 1.

Similarly the pressure in the accumulators 44 is adjusted so that for the given depth and pipe, it enables a force to be communicated to the slide 2 such that whatever the sea conditions the jaws 22 always exert on the section 50 a tensile force which avoids any wave of transverse deformation.

The pressure in the accumulators 48 is also regulated so that the slide 10 constantly balances the weight of the new section 14 lying out of the water.

Let us suppose that the bare end of the section 50 is being held by the jaws 22 supported by the ramp 1 but sliding on it through the slide 2 and that the ramp 9 is lying in the horizontal position. Then by any known means a new section 14 is loaded onto the rollers 13, counter-rollers 13a completing the hold on the section 14 during the course of the subsequent tilting of the ramp. The end of the section 14 is seized by the jaws 12. In this position the slide 10 is in its right-hand extreme position because of the pressure exerted by the accumulators 48 on the jack 46. Before tilting of the ramp 9 by means of the winch 31, a connector 15 is introduced into the section, which is attached to an electro-carrier cable 18 passing round a pulley 16 the spindle of which is carried by a unit 17 carried by the slide 10. The cable 18 passes over a pulley 45 on ramp 9, a pulley 24 mounted on the slide 2, and a pulley 25 which is mounted on the ramp 1, before being wrapped round a control winch 4. Thus when at the end of raising the ramp 9 the hooks 52 and 53 are locked together and the slides 2 and 10 are made one by means of the jack 8 the catcher device 7 of which attaches itself to the end 3 of the arm 54, displacements of the pulley 24 and 16 are synchronized. The result is that the connector 15 preserves its position with respect to the sections 50 and 14, whatever the pounding movements undergone by the surface support 20, if the winch 4 is not operated.

Synchronization of the slides 2 and 10 is effected progressively by means of the synchronization jack 8 as soon as the device 7 has latched onto the end 3 of the arm 54, recentering the operating travel of the slide 2 with respect to the travel of the slide 10 and then locking the jack 8 in this position. The jacks 42, 46 and 8 preferably have identical throws C.

Inside the pipe P a device 29 may be arranged for checking the gauge of the pipe. The device may be similar to that described in the French patent application No. 73.30931 which can lock itself in a watertight manner into the tube even in the event of the gauge not being true and may be drawn by a cable 28 carrying a source 27 for radiographic checking of successive pipe sections as well as a fixing-device 19 equipped with a set of jaws 21 for bearing against the inner wall of the section 50, seals which may be inflatable preventing any penetration of water inside the pipe P. The end of the device 19 has catching means capable of being connected to or disconnected from the connector 15 controlled by the electrocarrier cable 18.

Thus after synchronising displacements of the slides 2 and 10, it is sufficient to operate the winch 4 so as to lower the electro-carrier cable 18 until the connector 15 locks onto the fixing device 19 which is supporting by the cable 28 the source 27 and the gauging device 29. After releasing the jaws 21 of the device 19, the new section 14 is lowered by translation of the jaws 12 controlled by jacks 56, the alignment of the sections 14 and 50 being adjusted when the pipes are to be screwed together or the parallelism of the bevels being adjusted when the pipes are to be welded. This adjustment may be effected, for example, by making the rollers 13 adjustable in two different directions. After sliding of the tube 14 over the device 19 the jaws 21 are again tightened against the inner wall of this section.

Welding of the section 14 to the end section 50 of the pipe P is effected by employing a work-platform 39 which is displaced with the slide 2 so that during the whole of the welding operation the platform is fixed with respect to the pipe. At the end of welding the fixing device 19 is unlocked from the section 50 of the pipe by freeing the jaws 21 and the source 27 is brought into the plane of weld by winding up the electro-carrier cable 18 on the winch 4. The internal jaws 21 are then brought into action again in this new position.

The winch 4 is brought progressively under tension so as to take up through the cable 18 the weight of the pipe as completed by the section 14. After release of the jaws 22 and 12, the winch 4 enables the plane of weld to be lowered to the level of a second work-platform 40 where wrapping of the joint and the bared portions of the new section 14 is carried out. After this last operation the surface support 20 is displaced by the length of the section 14 to its new fixed point, the pipe being progressively lowered along the ramp under the control of the winch 4. The speed of unwinding of the winch is regulated so as to keep a correct operating region of the two slides in order that, during the whole of the movement, the slide always exerts a tensile force on the end of the pipe. When the surface support reaches the new fixed point the top end of the connected section 14 which constitutes the end of the pipe P is stopped at the level of the jaws 22 of the ramp 1. The internal jaws 21 of the fixing device 19 are unlocked and this device is raised again by means of the winch 4 in order to be ready to receive a new section. The electro-carrier cable 18 controls the release of the connector 15 which is freed from the device 19. After freeing of the locking means 52, 53 the ramp 9 is brought back to the horizontal to receive a new pipe section after unlocking the connector 7 from the jack 8.

Although the structure and the method described are particularly well adapted for the laying of pipes of any size at any depth, numerous modifications might be made to the various parts of the structure or to the various phases of the method. Thus instead of synchronizing the movements of the slides 2 and 10 by the jack 8 the pressures in the jacks 42 and 46 may be controlled after tilting of the ramp 9 so as to let the whole of the weight be supported by the slide 2. Similarly displacement of the slide 2 may be measured so as to bring under control the end of an auxiliary jack subsidiary to the slide 10 so that it follows the movement of the slide 2, a mechanical locking of some kind integrating the two slides after synchronization. One can employ, for example, the jaws of the fixing device 19.

Similarly the telescopic system 38 for the control of the slope of the ramp 1 may be replaced by an arm of fixed length, the position of its bearing point 37 varying along the surface support by means of a slideway.

As to the various jaws employed, e.g. jaws 12 or 22, they may be of a conventional type employed in drilling operations and appear in the form of a housing containing clamping wedges manipulated by any motive device.

What is claimed is:

1. A method of assembling and laying an undersea pipe from a surface support having a variable inclination laying ramp comprising: sequentially fixing a new pipe section to the end of a pipe portion already submerged, supporting said submerged section at the end to be coupled on the laying ramp, and moving said surface support by a distance corresponding to the length of the new pipe section simultaneously with submersion of the new pipe section, wherein said submerged pipe portion is suspended from said surface support and the tension in said submerged pipe portion is maintained substantially constant irrespective of vertical movements of said surface support relative thereto by providing first damping means between the pipe suspension means and said surface support.

2. A method as claimed in claim 1, including suspending the new pipe section to be connected from said surface support and maintaining the tension in said new section substantially constant by providing second damping means between the suspension means of said new pipe section and said surface support.

3. A method of assembling and laying an undersea pipe from a surface support having a variable inclination laying ramp comprising, sequentially fixing a new pipe section to the end of a pipe portion supported by the laying ramp and which has already been submerged, moving said surface support by a distance corresponding to the length of the new pipe section simultaneously with submersion of the new pipe section, wherein said submerged pipe portion is suspended from said surface support and the tension in said submerged pipe portion is maintained substantially constant irrespective of vertical movements of said surface support relative thereto by providing first damping means between the pipe suspension means and said surface support, and suspending the new pipe section to be connected from said surface support and maintaining the tension in said new section substantially constant by providing second damping means between the suspension means of said new pipe section and said surface support.

4. A method as claimed in claim 3, including adjusting said second damping means to balance the weight of said new pipe section.

5. A method as claimed in claim 3, including synchronizing movements of said suspension means of said new pipe section and said submerged pipe portion before fixing said new pipe section to said submerged pipe portion.

6. A method as claimed in claim 5, wherein said movements are synchronised by connecting members carrying said suspension means of said new pipe section and submerged pipe portion.

7. A method as claimed in claim 5, including regulating said first damping means so as to maintain the said tension constant after fixing the new pipe section to said submerged pipe portion.

8. A method as claimed in claim 3, including transferring suspension of said submerged pipe portion to other means of suspension of said submerged pipe portion, which is connected by a cable to a winch on said surface support, the cable being coupled to said first suspension means of said submerged pipe portion so that all the forces absorbed by said first damping means can be progressively taken up by said cable as suspension of said submerged pipe portion is transferred thereto.

9. A method as claimed in claim 8, including checking the interior of the submerged pipe portion by checking means inside said pipe portion, said checking means being moved along said pipe portion by lowering an electro-carrier cable inside said new section and said pipe portion and automatically connecting said cable to an automatic fixing device carrying said checking means and which can be locked to said pipe wall and freed therefrom by operation of the electro-carrier cable.

10. A method as claimed in claim 3, wherein fixing of the new pipe section to said submerged pipe portion is preceded by displacement of said new pipe section relative to the surface support.

11. A method as claimed in claim 10, wherein displacement of said new pipe section relative to said surface support is controlled as a function of movement of the end of said submerged pipe portion relative to said surface support.

12. Apparatus for assembling and laying an undersea pipe from a floating support, comprising: a variable inclination laying ramp on a surface support, means for suspension of a submerged pipe portion from the surface support, said means suspending the pipe at an upper end thereof, means for bringing a new pipe section into alignment with the upper end of the submerged pipe portion for fixing thereto and means for submerging a newly fixed pipe section, wherein said suspension means is connected to said surface support by first damping means permitting movement of said suspension means relative to the support.

13. Apparatus as claimed in claim 12, including tiltable feed ramp means for supporting the new pipe section to be connected, suspension means on said feed ramp for suspending the new pipe section and second damping means permitting movement of said suspension means relative to the surface support.

14. Apparatus as claimed in claim 12, wherein said first damping means comprises a jack supplied by a hydropneumatic accumulator.

15. Apparatus as claimed in claim 13, wherein said second damping means comprises a jack supplied by a hydropneumatic accumulator.

16. Apparatus as claimed in claim 14, wherein said jack bears against said laying ramp and a member supporting said suspension means.

17. Apparatus as claimed in claim 15, wherein said jack bears against said feed ramp and a member supporting said suspension means.

18. Apparatus as claimed in claim 13, including connecting means for said suspension means of the new pipe section and the submerged pipe portions said connecting means synchronising the movements thereof.

19. Apparatus as claimed in claim 18, wherein said connecting means includes a jack which is operable to bear against members on which said suspension means are mounted.

20. Apparatus as claimed in claim 13, wherein said suspension means of the new pipe section are mounted on a member connected by said second damping means to said feed ramp, said suspension means being movable relative to the member.

21. Apparatus as claimed in claim 13, including a guide pulley mounted to move with at least one of said suspension means, a cable connected to a winch on said surface support, passing round the guide pulley and extendable into a new pipe section and the submerged pipe portion.

22. Apparatus as claimed in claim 21, including a fixing device movable within a pipe section and adapted to be locked relative to a pipe section and to be unlocked therefrom and a connector device for connection to said fixing device.

23. Apparatus as claimed in claim 22, including an electro-carrier cable connected to said connector device for automatic connection of said connector device and operation of said fixing device.

24. Apparatus as claimed in claim 23, including a checking device for checking the wall of the pipe portion and supported by said fixing device, and a work platform mounted on said surface support to move with the submerged pipe section suspended therefrom.

25. Apparatus as claimed in claim 12, wherein the inclination of said laying ramp is varied by displacement of the common pivot axis of two rods one of which is pivotally connected to said surface support and the other of which is pivotally connected to said laying ramp.

26. A method of assembling and laying an underwater pipe from a floating surface support including the steps of: suspending a portion of said pipe which has already been submerged from said surface support at an end to be coupled to a new pipe section, sequentially fixing a new pipe section to said submerged pipe portion at the end to be coupled, submerging said new pipe section, simultaneously moving said surface support by a distance corresponding to the length of said new pipe section, and maintaining the tension in said submerged pipe portion greater than a critical tension at which waves of transverse deformation appear in said pipe portion by compensating for changes in said tension in said submerged pipe portion resulting from vertical movements of said surface support.

27. A method as claimed in claim 26, including suspending said new pipe section from said surface support before fixing it to said submerged pipe portion, and maintaining the tension in said new pipe section substantially constant by compensating for changes in the tension in said pipe section resulting from vertical movements of said surface support.

28. A method as claimed in claim 27, including synchronising movements of said new pipe section and the end of said submerged pipe portion relative to said surface support before fixing said new pipe section to said submerged pipe portion.

29. Apparatus for assembling and laying an underwater pipe from a floating surface support, comprising: means for suspending a submerged pipe portion from said surface support at an end to be coupled, means for bringing a new pipe section into alignment with the end of the submerged pipe portion to be coupled for fixing thereto, means for lowering the new pipe section when fixed to the submerged pipe portion and means for simultaneously displacing said surface support, wherein said suspension means is mounted on said surface support by compensating means causing movement of said suspension means relative to said surface support so as to maintain the tension in the submerged pipe portion substantially constant and greater than a critical tension at which waves of transverse deformation appear in the pipe regardless of vertical movements of the surface support relative to the submerged pipe portion.

30. Apparatus as claimed in claim 29, including means for suspending the new pipe section from said surface support and compensating means for compensating for changes in tension in said suspended pipe section resulting from vertical movements of said surface support.

31. Apparatus as claimed in claim 30, including means for synchronising movements of said suspension means for said submerged pipe section and said new pipe section.

* * * * *

UNITED STATES PATENT OFFICE
CERTIFICATE OF CORRECTION

Patent No. 4,068,490        Dated   Jan. 17, 1978

Inventor(s) Michel J. Jegousse

It is certified that error appears in the above-identified patent and that said Letters Patent are hereby corrected as shown below:

IN THE HEADING:

[73] Assignees: After "de Bretagne" insert -- A.C.B. ----
     (4th line)

IN THE SPECIFICATION:

Column 3, line 37, after "weight" delete [50] and insert
        ---- , so ----

Column 4, line 29, delete "electrocarrier" and insert
        --- electro-carrier -----

Signed and Sealed this

Twentieth Day of June 1978

[SEAL]

Attest:

RUTH C. MASON
Attesting Officer

DONALD W. BANNER
Commissioner of Patents and Trademarks